(12) United States Patent
Lahaix

(10) Patent No.: US 8,527,594 B2
(45) Date of Patent: Sep. 3, 2013

(54) BLOG ADVERTISING

(75) Inventor: Dominique Lahaix, Saint Martin d'Uriage (FR)

(73) Assignee: Ecairn, Inc., Los Gatos, CA (US)

( * ) Notice: Subject to any disclaimer, the term of this patent is extended or adjusted under 35 U.S.C. 154(b) by 538 days.

(21) Appl. No.: 11/789,886

(22) Filed: Apr. 25, 2007

(65) Prior Publication Data

US 2008/0201222 A1    Aug. 21, 2008

Related U.S. Application Data

(60) Provisional application No. 60/901,769, filed on Feb. 16, 2007.

(51) Int. Cl.
*G06F 15/16* (2006.01)
*G06Q 30/00* (2012.01)

(52) U.S. Cl.
USPC ......... 709/206; 705/14.41; 715/758; 715/753

(58) Field of Classification Search
USPC ...... 705/14, 14.41; 707/101, 1–10; 709/206; 715/764, 758, 753
See application file for complete search history.

(56) References Cited

U.S. PATENT DOCUMENTS

| | | | |
|---|---|---|---|
| 5,956,737 A | 9/1999 | King et al. | |
| 6,018,710 A | 1/2000 | Wynblatt et al. | |
| 6,314,451 B1 | 11/2001 | Landsman et al. | |
| 6,519,362 B1 | 2/2003 | Cusmariu | |
| 6,785,659 B1 | 8/2004 | Landsman et al. | |
| 6,804,659 B1 | 10/2004 | Graham et al. | |
| 7,007,074 B2 | 2/2006 | Radwin | |
| 2004/0059712 A1 | 3/2004 | Dean et al. | |
| 2004/0093327 A1 | 5/2004 | Anderson et al. | |
| 2005/0010641 A1* | 1/2005 | Staack ........................ 709/206 |
| 2006/0085408 A1 | 4/2006 | Morsa | |
| 2006/0224447 A1 | 10/2006 | Koningstein | |
| 2006/0242013 A1 | 10/2006 | Agarwal et al. | |
| 2006/0282328 A1 | 12/2006 | Gerace et al. | |
| 2007/0005417 A1 | 1/2007 | Desikan | |

(Continued)

OTHER PUBLICATIONS

Mishne, Gilad et al. "Language Model Mixtures for Contextual Ad Placement in Personal Blogs" http://staff.science.uva.nl/~gilad/pubs/fintal2006-blog-advertisements.pdf.

(Continued)

*Primary Examiner* — Sun Li
(74) *Attorney, Agent, or Firm* — Lumen Patent Firm

(57) ABSTRACT

Blog advertisement selection and placement is driven by the analysis of different facets, which are defined as why-facet, how-facet, who-facet and what-facet. The objective of defining such facets and their labels is to be able to better classify and distinguish information from blogs with the goal to use these different facets to better target advertisements on blogs. A model of features is built and maintained that classifies information from blogs along the defined facets. The features, including non-keywords and keywords, are extracted from a set of blogs of at least one blogosphere. Non-keywords are related to the blog information and keywords, and assist the keywords in the classification of the different facets/labels. An advertising campaign is defined in terms of the defined facets. The model and the defined advertising campaign will then be able to determine and/or predict placement of an advertisement in a blog or blog page.

7 Claims, 5 Drawing Sheets

(56) References Cited

U.S. PATENT DOCUMENTS

| | | |
|---|---|---|
| 2007/0016473 A1 | 1/2007 | Anderson et al. |
| 2007/0043723 A1 | 2/2007 | Bitan et al. |
| 2007/0050389 A1* | 3/2007 | Kim et al. .................... 707/101 |
| 2007/0061297 A1 | 3/2007 | Bihun et al. |

OTHER PUBLICATIONS

Avensani, Paolo et al. "Learning Contextualised Weblog Topics" (2005) Proceedings of 2nd Annual Workshop on Weblogging Ecosystem Aggregation, Analysis and Dynamics. Eytan Adar, Natalie Glance, Mathew Hurst (Eds).

* cited by examiner

BLOG ADVERTISING

CROSS-REFERENCE TO RELATED APPLICATIONS

This application is cross-referenced to and claims priority from U.S. Provisional Application 60/901,769 filed Feb. 16, 2007, which is hereby incorporated by reference.

FIELD OF THE INVENTION

The invention relates generally to advertising on the Internet and on any interactive medium such as a global network of interconnected information devices. More particularly, the invention relates to advertisement placement on blogs.

BACKGROUND OF THE INVENTION

Online advertising has vastly grown since the development of the Internet. We are all familiar with the advertisements placed in advertisement solution providers like Google and Yahoo, or companies focusing on similar solutions like AdBrite and Federated Media.

The goal of these online advertisement solution providers is to find advertising opportunities for companies and their marketing campaigns. Companies describe their advertisement project in a format provided by the advertisement solution provider. This is typically accomplished with a set of keywords or phrases indicating the type of product or service they would like to advertise. Furthermore, companies can also indicate socio-demographic information or the type of audience they would like to reach (e.g. gender or age group). The socio-demographic information can be matched to information collected by the subscribing web sites through surveys or self documented profiles.

An advertisement could then be placed on a webpage when the solution provider finds a match between the defined advertisement keyword(s) and the information displayed on that webpage. For example, an advertisement can be placed in a web page with search results in Google or in an information webpage of an online newspaper. For the purposes of the present invention the keywords describing the type of product or service is referred to as a what-facet. The information describing the type of audience is referred to as a who-facet.

The what- and who-facet describing an advertisement project works well for general and traditional Internet traffic and websites. Unfortunately, they fall short when an advertiser needs to deliver a message to specific audiences in a specific context that can't be identified by these two facets.

A consumer electronic company could have different advertisements aimed at a diverse group of consumers for example depending on whether it performs an awareness campaign or a loyalty one. For example, different advertisements could be: "buy a new device", "buy accessories", "tell a friend", or "upgrade your memory". Examples of different advertisement groups could be: "A consumer that already owns an electronic device", A consumer that does not own an electronic device", "A consumer who is an experienced user of the electronic device", or "A new consumer who is a novice user of the electronic device". It would be either be impossible or at least ambiguous to find one or more keywords defined as what- and who-facets that would trigger an advertising opportunity to target a "novice consumer" for "buying new accessories".

Similarly, a financial institution desiring to promote new type of mortgage could also have different advertizing aimed at people in different contexts. Examples of advertisement could be a "your dream come true" video ad or a "no fee if you contract this month" text message. These advertisements could be placed on different sites which are talking about mortgage; some being personal diary blogs and others being blogs focused on discussing mortgage in detail. Again it would be impossible or at least ambiguous to find keywords that would trigger the advertising in these different contexts.

Accordingly, there is a need in the art of online advertising to develop new techniques to handle such specific advertising opportunities, especially if one would like to reach an audience in a blogosphere. Blogs are web logs published by people to express their opinion, broadcast a message or chat with other people. Because of this very nature of blogs and their wide diversity comparing to traditional websites an advertiser would need to find new ways to target blogs and their publishers with specific advertisements. The present invention addresses these needs.

SUMMARY OF THE INVENTION

The present invention is a method for selecting and placing an advertisement on blogs. The advertisement selection and placement is driven by the analysis of different facets either separately or in any combination of facets. In one embodiment, the facets are defined as a why-facet, a how-facet, a who-facet and a what-facet. The objective of defining such facets is to be able to better classify and distinguish information from blogs with the goal to then use these different facets to better target advertisements on blogs or blog pages. An important aspect of the invention is that the method of advertisement selection and placement does not rely on any self-declared profile, demographic description or survey. Instead the method relies on extracted and classified information from blogs themselves.

The why-facet defines an objective of an advertising message and/or an advertising target, whereas the how-facet defines a style of said advertising message and/or said advertising target. The what-facet defines the type of product or service of the advertising message and/or the advertising target, and the who-facet defines the type of audience for the advertising message and/or the advertising target.

Each facet includes one or more labels. For example the why-facet labels are adopt, use or improve. The how-facet labels differentiate the style, originality, nature or complexity of an advertisement or a message. The what-facet labels define the type of product or service of the advertising message and/or the advertising target. The who-facet labels define the type of audience for the advertising message and/or the advertising target.

A model of features is built and maintained that classifies information from blogs or blog pages along one or more of the defined facets. The features are extracted from a set of blogs or blog pages of at least one blogosphere. In particular, these features include non-keywords and keywords. Non-keywords are related to the blog information and keywords, and assist the keywords in the classification of the different facets/labels.

An advertising campaign is defined in terms of the defined facets, which could be one or more of different facets. The model and the defined advertising campaign will then be able to determine and/or predict placement of an advertisement in a blog or blog page.

BRIEF DESCRIPTION OF THE FIGURES

The present invention together with its objectives and advantages will be understood by reading the following description in conjunction with the drawings, in which.

DETAILED DESCRIPTION OF THE INVENTION

The invention provides new ways to define an advertisement project that supports a marketing strategy of a company. The specific embodiment described herein relates to blog advertising, but would also be applicable in other online advertising systems with consumer-generated content.

Figure 1:
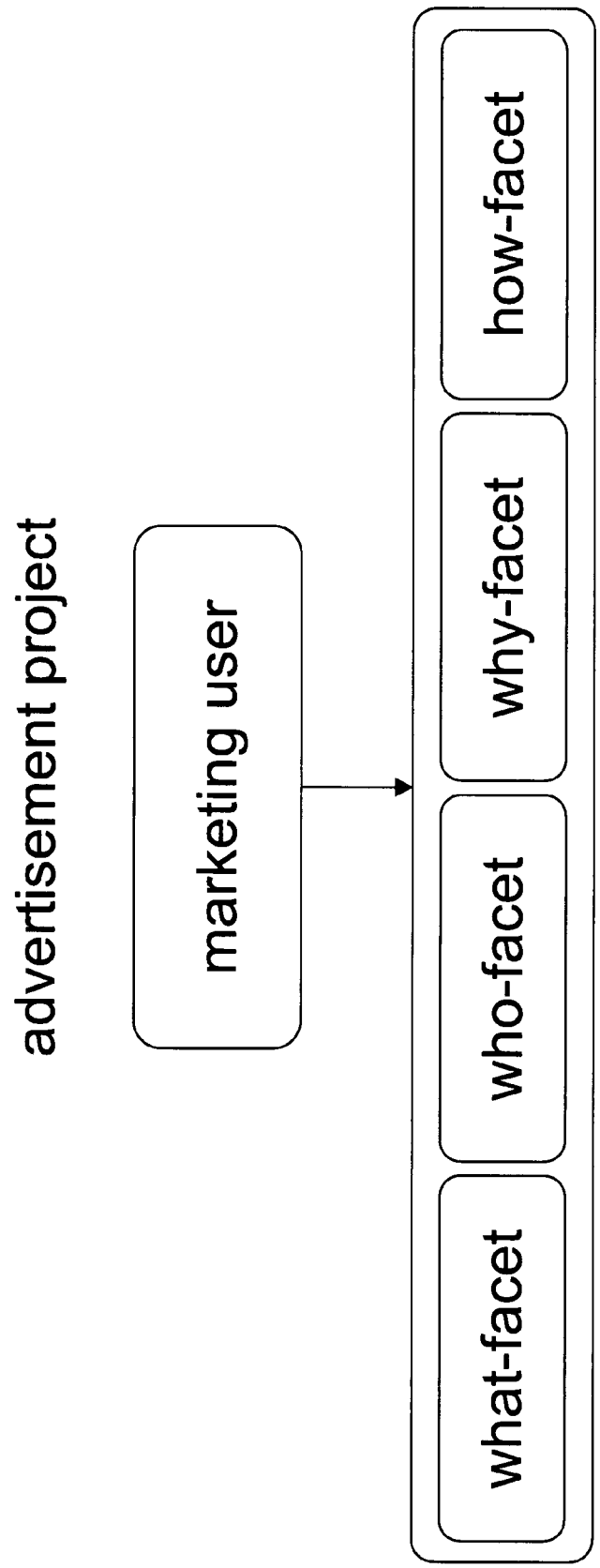
FIG. 1 shows the definition of an advertising project according to the present invention.

An advertisement project is targeted to display an advertisement about a product or a service to a specific audience in a blog. More specifically, the goal of the advertisement project is to target a specific action (an order, a click, the fill-out of a form or the like) by a person using a specific message with an advertisement. To achieve this goal, the advertisement project could distinguish four different facets: what-facet, who-facet, why-facet and how-facet (see FIG. 1). These facets could either be used singular or in any combination of facets.

The what-facet relates to the specific product or service. The who-facet relates to the specific audience based on geographic, demographic, sociological, psychographic and behavioral characteristics. The last two facets, the why and how-facets, are the key distinguishing factors over prior technologies and make the present invention surpass keywords-driven methods or subscription-driven methods. The why-facet relates to a specific action of a person or audience, which defines the objective of the advertisement message or target. The how-facet relates to a specific message, which defines the style of the advertisement message or target. Capturing these two facets via keywords-driven methods or subscription-driven methods would be ambiguous or impossible since these two facets require a combination of non-keyword features and keyword features to classify blogs (see infra).

Figure 2:
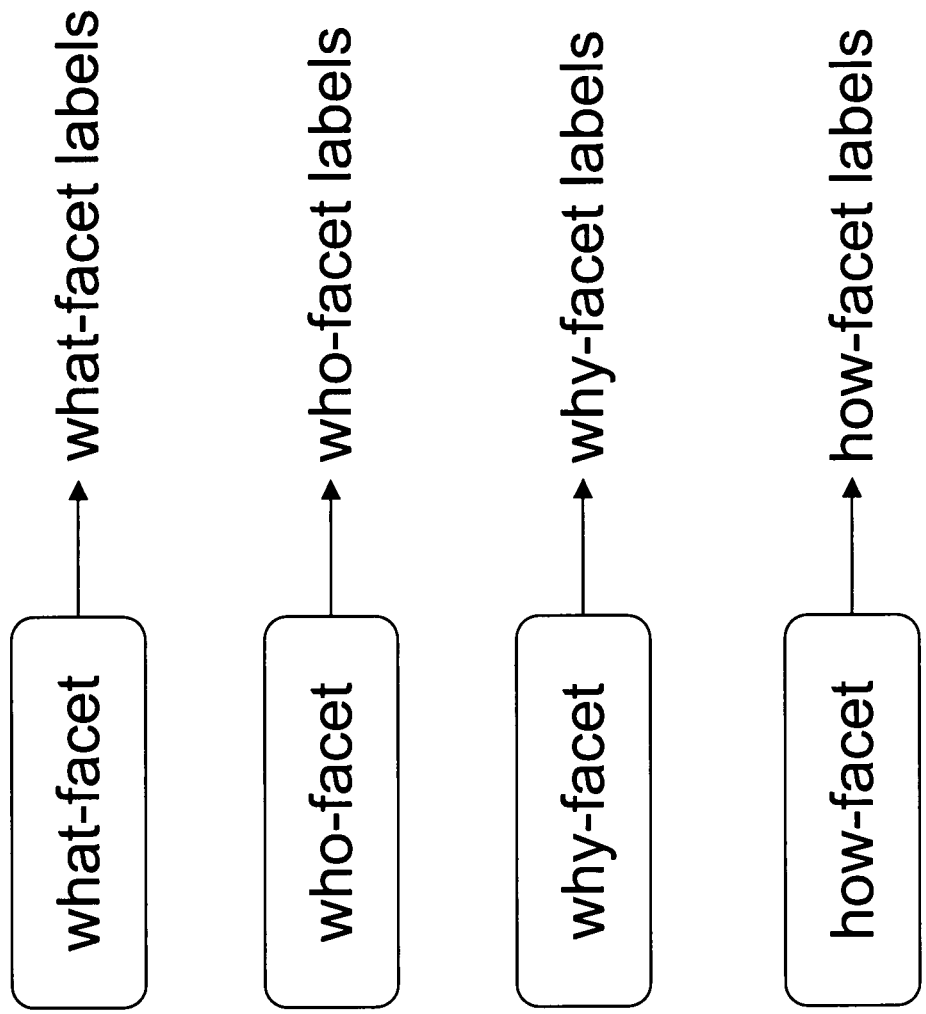
FIG. 2 shows according to the present invention different facets and their labels.

Each facet distinguishes a number of labels (see FIG. 2), such as for example:

- The what-facet could include labels like computer, cars, iPods, loans etc.
- The who-facet could include labels to differentiate gender, age, location, language, orientation, income, occupation, maturity (labeled as innovator, early adopter, slow-developer, level of maturity, etc), state-of-awareness (e.g. labeled by expression of a particular URL), link-to (labeled by a link to a person).
- The why-facet could include labels like objective (e.g. adopt, use or improve).
- The how-facet could include labels to differentiate style (e.g. labeled as promotional, incentive, information, education, announcement, community, games or the like), originality (e.g. high, low, none), nature (labeled as information, communication, topic blog, personal-journal, spam, or the like), complexity (e.g. high, medium, low such as high-video, some vide high image some image, large posts, medium posts, blog-caps or the like).

Figure 3:
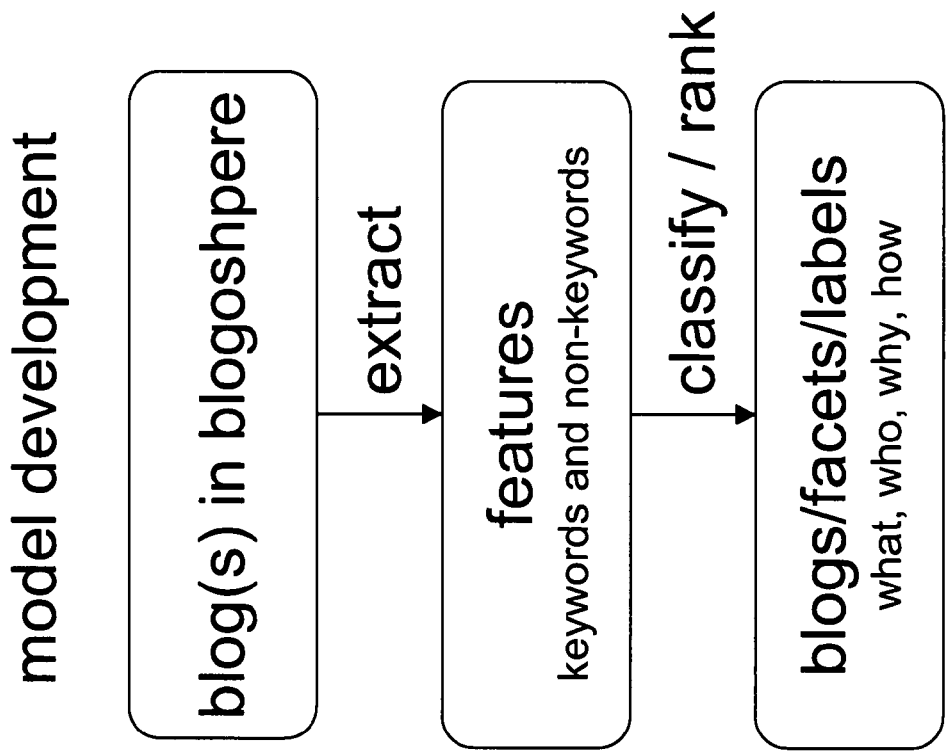
FIG. 3 shows according to the present invention the development of a model whereby blogs are analyzed for their content and classified along facets and their defined labels.

As shown in FIG. 3, features are extracted from blogs in a blogosphere and used to develop and maintain a model. In one example a random set of blogs is analyzed and features relative to the blog's content are extracted. Features are defined as non-keyword(s), tags and keyword(s) features.

Examples of non-keywords are, but not limited to,
- "Structure features" like: presence, density of Urls, Tables, Numbered list, Un numbered list, Length of the blog, Number of posts, Number of comments per posts, Links to social sites, Min, max, average, spread and corrected average of Length of post and comments,
- "Style features" such as presence and density of Picture, image, Video clip, Caps, '!' and '?', Numbers, Dates, Emoticons, Screenshots, Min, Max, average, spread and corrected average of length of sentence,
- "Linguistic features" such as the use of <<I verb>>, <<You verb>>, Spelling mistakes,
- "Sales and Marketing artifacts" features such as presence, number and density of Prices ($, €, discount % x), e-commerce sites,
- "Domain specific artifacts" features such as presence, density of product & service names, company names and brand.

Tags, provided by the person posting content and comments, could be used as additional features associated to the non-keyword features. An example could be "Inkjet printer", "business", "mortgage", "New-York", etc.

Most significant keywords, from the blog page are also used as additional features associated to the non-keyword features. Various methods can be applied to select these most significant features. An example could be Term Frequency/Inverse Document Frequency following stopword removal and optional stemming. Another example could be information gain.

Figure 4:
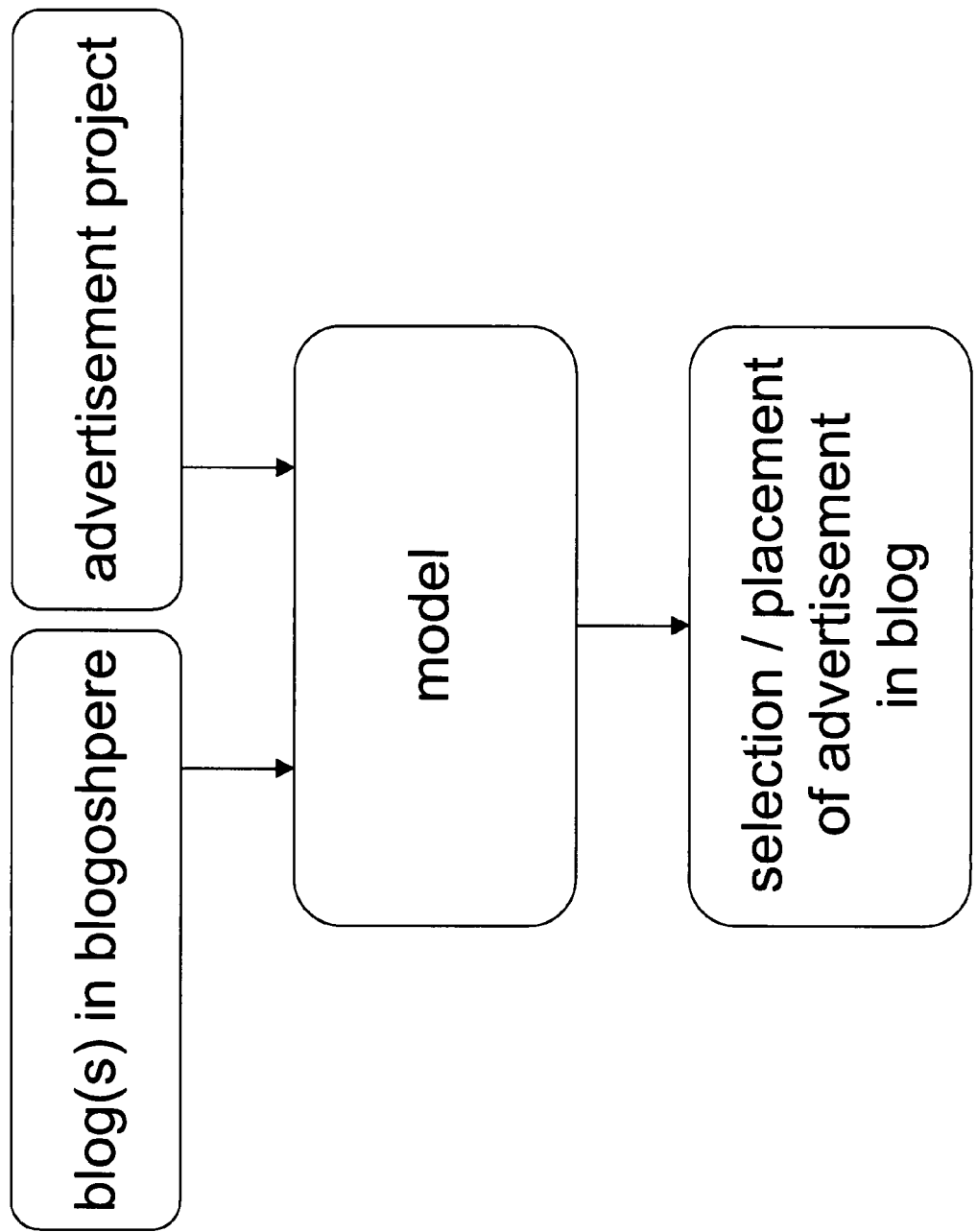
FIG. 4 shows according to the present invention the method of selection and placement of an advertisement in a blog.

The analyzed blogs are then classified along the facets based on the extracted features. The goal is to obtain representative sets of blogs for each facet and their defined labels. This representative set can then be used as a model to predict advertisement selection and placement in blogs (see FIG. 4).

Machine learning techniques can be used to build a classifier to predict the label of a blog based on the identified features. There are various machine learning techniques, which are know in the art, that can be applied such as decision trees, bayesian techniques, support vector machine learning or the like. One or more models can be built to predict facet/label values. In the case of multi-label facets, several models are built. For example, one predictive model for each facet label (i.e is this blog of label A? Yes or No) and one model for all labels (i.e is this blog A or B or C?).

A voting technique can also be used to augment the precision of the learning algorithm. The voting technique could work as follows. If the value for "all label predictors" predicts facet-label X and the X facet-label predictor predict "yes" or above 50% confidence, then the model predicts that X is the appropriate facet-label for the blog. Otherwise, the model will select the facet-label Y where the Y facet-label predictor has the highest confidence. The confidence threshold can be set for validation of the prediction. If the threshold is not met, the blog could remain unclassified.

The incorporation of non-keyword features into the classification could be accomplished in the following ways:
- A structural analysis of the blog to evaluate the presence and Urls, Tables, Numbered list, Un-numbered list, Length of the blog, Number of posts, Number of comments per posts, Links to social sites, Min, max, average, spread and corrected average of Length of post and comments.
- A style analysis to evaluate the presence and density of Picture, image, Video clip, Caps, '!' and '?', Numbers, Dates, Emoticons, Screenshots, Min, Max, average, spread and corrected average of length of sentence.

A linguistic analysis to evaluate the presence of spelling mistake and the use of particular styles like "I verb", or "You verb". The blog is then parsed, stemmed, stop words are removed with care (words like "now", "thank", "look", "double" or the like are not removed in contrast with traditional stop word routines).

We then check for the presence of "Sales and Marketing artifacts" features such as presence, number and density of Prices ($, €, discount % x), E-commerce sites or "Domain specific artifacts" features such as presence, density of product & service names, company names and brand.

Example of Why-Facet Classification

The following is an example of classifying a why-facet. The example also demonstrates the shortcomings of keyword-based approaches to correctly classify blogs along the why-facet. Consider the following blogs A, B, C and D that are retrieved using a keyword search on iPod.

Blog A (excerpt of original blog with typos included):

"I have alot of friends who want to buy a Ipod. Most of them have one. I think Ipods are bad because you have to pretty much pay for the Advertisements and the Apple Logo. I have been looking at Ipods, Mp3 players, and Microsoft. Microsoft made an item to go against Apple. Microsoft item is not worth buying—Ipod Nano—A Ipod Nano is probally the popularist. It has lots of space. It is around $199.00. The 4 GB is in 5 colors. It hold up to 1000 songs. The five colors are -White, Green, Light Blue, Pink, and Black-. It's battery lasts about 24 hours and has brighter screens now. It's only 3.5 In. Tall!! I think thats kinda small, Don't you?"

Blog B (excerpt of original blog without the picture of an iPod screen):

"Download and Play YouTube Videos on Your iPod PDA or Computer: iTube is a simple, easy to use Windows program that enables you to download movies from major video sharing sites (YouTube, DailyMotion, Metacafe, etc) and use them on your desktop. It will automatically convert it into either MPEG (plays on every computer) or MP4 (plays on iPods) and save it for you. iTube can also optionally import the file into iTunes, so that on the next sync it will appear on your iPod Video.

Simply enter in the YouTube page URL and iTube will download the file, convert it, and then import it directly into iTunes. The next time you plug in your iPod video it will automatically transfer. If you don't have an iPod video, you can still watch the movie in iTunes"

Blog C (excerpt of original blog without the iPod configuration screens):

"Two weeks ago I showed you how to copy DVDs to an iPod. Now it's time to let everyone else in on the action. If you have a Creative Zen Vision, Microsoft Zune, Pocket PC or any other Windows-centric portable player that can handle video, get ready for some movie love.

What to do

Once you've installed all your software (and rebooted Windows, just to be on the safe side), plop a DVD into the drive and fire up DVD-WMV. Then follow these steps:

1. Click the Settings tab. Change the Output Folder if you want the converted movie to land somewhere other than your My Documents folder. In the DVD Drive field near the bottom-right corner, make sure the correct drive letter is selected.
2. Click the First Encode tab and check the box marked Custom First Encode Options.
3. Change both the audio and video modes to "Constant Bit Rate (CBR)."
4. Set the Video codec to "Windows Media Video 9," the audio codec to "Windows Media Audio 9.2."
5. Set the Audio Format to "128 Kbps, 44 kHz, stereo CBR."
6. In the Video Size box, check Custom Video Size and change the numbers to 320×240. (If your video ends up vertically stretched, try 320×188.)
7. In the Video Bit Rate box, enter 524288, which translates to 512 Kbps. You can experiment with different numbers, but I find this a very acceptable video quality, one that works well with most players.
8. Click the Movie Data tab and enter the name of the movie. You can click Query IMDB if you want to fetch more details from the internet, though it's the rare player that can display any of this info.
9. On the left side of the DVD-WMV window, click Full Movie Backup—and be prepared to wait. The process will probably take a good two hours for each movie, if not a little longer.
10. When it's done, copy the movie to your portable player using Windows Media Player (or whatever program your player requires).

Problems? Visit the DVD-WMV forums to pick other users' brains.

Know of a better way to make movies mobile? Share your insight with the world by posting in the comments."

Blog D (excerpt of original blog):

"You don't have to buy apple's video cable to play videos on your TV from your video Ipod all you need is an eighth-inch-to-RCA cable, you can pick one up on eBay for five or six bucks shipped. Search for "camcorder A/V cable." Remember, you want a three-plug yellow/red/white RCA connection at one end and a three-banded eighth-inch (3.5 mm) A/V plug at the other.

You set your Ipod to output a TV signal
Then you plug the cable in like this:
Plug the red RCA plug into your TV's yellow RCA jack
Plug the yellow RCA plug into your TV's white RCA jack
Plug the white RCA plug into your TV's red RCA jack
Bang you are done your TV should now be able to play the video from your Ipod. I tried this little trick myself and it works perfectly just make sure you outputting the right signal for your TV to read (NTSC or PAL). To open these settings, choose Videos→Video Settings from your main iPod menu. This screen offers three settings. TV Out, TV Signal and Widescreen. If the hack didn't work it might be the cable my friends tried this with their camcorder cables and 10% of them didn't workfor whatever reason"

The classification would be as follows in case the labels for the why-facet are defined as "Adopt", "Use" and "Improve, representing the objective of the campaign/blog.

Blog A is classified as a why-facet Adopt Blog, since the audience for the post is someone who is learning about the iPod.

Blog B is classified as a why-facet Use Blog since it explicitly refers to the things one can do when owning an iPod.

Blogs C and D are classified as a why-facet Improve Blog.

The features that participate in the classification of these blogs are for example:

the density of "I have" and personal style in the case of Blog A is indicative of "Adopt"

Excessive Use of "!" in the case of Blog A is indicative of "Adopt"

Mention of price in the case of Blog A (it could be any price) is indicative of "Adopt"

Mention of other Brands in the case of Blog A is indicative of "Adopt".

The main screen picture is indicative of "Use"

The mention of social sites like Youtube and the like is indicative of a "Use"

Screenshots in the case of Blog C is indicative of an Improve"

Lists (numbered and un numbered) in the case of Blog C and D clearly indicate a process description hence indicative of an "Improve"

Excessive presence of "numbers" in the case of Blog C is indicative of an "Improve"

It is noted that none of these non-keyword features alone would qualify the blogs in a given facet/label category with appropriate accuracy. However if these non-keywords are combined with keywords, such as "friends", "plug", "Kbps", and with similar repetitive patterns being found in other blogs as a result of training the model of for example the why-facet label type Adopt, Use, Improve they will enable a proper classification of any blog along the why-facet.

Example of How-Facet Classification

The following is an example of classifying a how-facet. The example also demonstrates the shortcomings of keyword-based approaches to correctly classify blogs along the how-facet. Consider the following blogs E, F.

Blog E:
—post 1
My New iPod.
So they offered me a 10% discount if I recycled my old iPod.
It's black and only has 30 GB.
It's my way of pouring some for my homies that are gone.
Labels: Moving On
—post 2
My iPod.
I dropped my iPod.
I dropped my iPod on the running path at Huntington Beach. I screamed so loudly that the poor man who was biking by at the time thought he hit me. As I picked up my iPod I *actually* looked around to see if anyone was going to bust me and call iPod protective services. I keep my iPod in my purse. I brazenly toss my purse around without thought to my iPod. Apparently I throw my purse with much venom and little thought to it's precious cargo. I dropped my iPod in Jocelyn's bathroom as I was futzing with my travel speakers. It narrowly missed the toilet, opting for the hard tile instead (I don't blame it). I went too far.

My iPod finally gave me a piece of it's mind. It gave me the iPod version of the bird. It made the sad iPod face. It was the same face I gave the Apple store guy. He gave me that sad face back when he said "sorry." I could feel his pity. I humbly took it because I am now iPod-less. . . . For some reason I expected this little consumer electric product to last forever . . . but I guess forever is really only in my heart.

iPod 5 G 60 GB in black.
10/13/2005-3/10/2007 :<(
Blog F:
Apple iPhone Forum Launched (Pocket PC Thoughts)
I read this article on "iphone" but I can't remember where
The iPhone is a beauty. Where else can you find elegance and innovation in one small and lightweight handheld device? Where else can you find mobile technology that just, boom, works? We simply cannot comprehend a life without the iPhone, so in honour of Steve's latest creation, we're doing the unthinkable by launching a new iPhone forum right here at Pocket PC Thoughts. So, get the ball . . .

The classification would be as follows in case the labels for the how-facet are defined as "Personal Diary", "Topic Blog", "Forum", "Spam", . . . representing the nature of the campaign/blog.

Blog E is classified as a how-facet "Personal Diary" Blog,

Blog F is classified as a how-facet "Topic" Blog

The features that participate in the classification of these blogs are for example:

the length of the post, the diversity in post lengths (some large, some small) in the case of Blog E is indicative of "Personal Diary"

the personal style (excessive use of I) in the case of blog E is indicative of "Personal Diary"

the homogeneity of the length of the post (10+ lines each) in the case of Blog F is indicative of a "Topic Blog".

It is noted that none of these non-keyword features alone would qualify the blogs in a given facet/label category with appropriate accuracy. However if these non-keywords are combined with keywords, such as "sorry", "heart" , "forum" , "handled device" and with similar repetitive patterns being found in other blogs as a result of training the model of for example the how-facet label type "Personal Diary", "Topic Blog" they will enable a proper classification of any blog along the why-facet.

Defining an Advertisement Project

An advertising project can be initiated by the user (e.g. marketing person of a company or an agency acting on behalf of the client) or can be built automatically by extracting information (e.g. advertisements or marketing emails) from the client or their website. The bottom line for both approaches is that the advertisement project is defined in terms of facets and their labels. Marketing users could assist in identifying blogs that are useful but that is not required. The following description provides some examples of how advertisement projects can be defined. Consider a company with a three marketing campaigns to promote:

1—Nintendo DS accessories (e.g. a case) to people who already own a Nintendo game box;

2—The current Nintendo console at a discount before the launch of a new model; and 3—New Nintendo games that are already available on a competitor platform, but with an extra feature.

Using traditional keyword-based matching methods, the marketing person is left with very little option other than flooding the blogs where the "Nintendo" keyword is present with the three value propositions. The method of this invention enabled the marketing user with a more sophisticated and powerful approach.

Advertisement Project 1:

The marketing user identifies blogs that talk about "Nintendo DS" and will use the following facet as restrictors: Why-facet: use or improve (the marketing user is only interested to tap people that own a Nintendo DS).

The system will identify blogs that display content that is built for existing owners (identified as people that talk about features of a consumer electronic product; have conversations about consumer electronic product; or refer to knowledge sites and downloads) and not generic purpose game blogs with more promotional content or product reviews blogs that compare multiple offerings. This is accomplished by classifying the blog results list into the why-facet using pre-defined labels/predictors.

Should the marketing user have different cases for girls and boys, he/she can also use the Who-Facet with the gender label to propose different colors pink or blue in the ads so as to maximize impression to click.

Should the marketing user have different texts with various ranges of promotional nature (e.g. strong promotional versus light education type of message), he/she can use the how-facet and provide different wording that accommodate the blog style (personal diary versus topic blog for example).

The marketing user could rank the different facets/labels to prioritize blog advertisement selection and placement.

Advertisement Project 2:

The marketing user can target people based on their predicted ownership of Nintendo DS or Other console and send differentiated messages.

The marketing user can extend the product category search into topics that are close to Nintendo DS: games, video games, gaming, gamecube, xbox, gameboy advanced, play station.

The marketing user selects the why-facet and could proceed according to the next two items.

Place a "10% off" type off ad for the blogs that match Nintendo DS or other tags like games, video games . . . (see list above) and the "Adopt" label of the why-facet.

Place a "tell your friend—or sponsor your friend and you'll get a coupon" for the blogs that matches Nintendo DS and "use" or "improve" label of the why-facet.

Advertisement Project 3:

The marketing user could search for blogs that refer to competitor URLs advertising a game and to place an advertisement that highlights the additional feature.

Since the marketing user wants to address a high quality audience including innovators, early adopters and people that can explain the feature properly, he/she could select the maturity label of the who-facet as "innovators" and "early adopters". The complexity label of the how-facet could be selected as "high" and the how-facet could further be labeled as "education", "announcement" or "community"

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art. For example, a ranking routine could be added that ranks either the classified information of the model predictions to optimize advertisement selection and placement. One could rank according to how recent the blog postings are, the access of blog postings, the level of engagement, keyword relevance, or the like. Level of engagement could be the frequency at which the blogger posts and/or the frequency and diversity of the comments. For example, a blog with one post a week and no comments could be ranked as zero engagement; a blog with one post a week and some comments, but always from the same blogger could be ranked as minimal engagement, a blog with one post a week and many comments from repetitive consumers could be ranked at high engagement.

Figure 5:
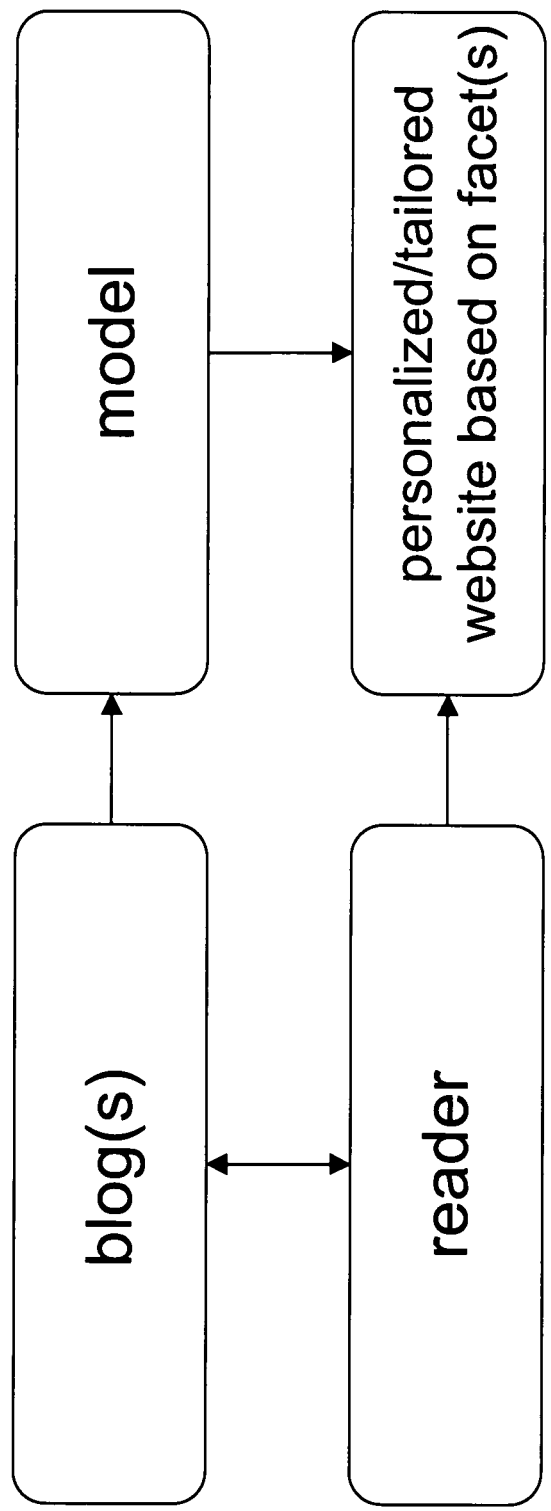
FIG. 5 shows according to the present invention an alternate embodiment of using facets.

In another variation to the present invention, the blog multi-facet classification can also be used for personalizing (tailoring) a website, including a landing page and/or subsequent pages, for an Internet user reaching that website from a blog (FIG. 5). In one exemplary embodiment, this could work as follows:

As previously discussed herein, a set of blogs in the blogosphere is selected. The features of these blogs are extracted and some models are built to predict facet values of any given blog;

A user coming from e.g. Blog A, reaches the website X, through a hyperlink;

The website has several options for landing page and subsequent logic: Page A, Page B, Page C;

It gets the identification of the blog the Internet user is coming from and retrieves through the predictive model, the facet values of this blog.

These facet values, potentially combined with other information the site already possesses about the user from a non exclusive list of information like, IP address, cookies, can be used to present the Internet use with Page A or Page B or Page C.

The following is an example of a personalization of an Apple landing page for a user coming from Blogs. Blog(s) has/have been classified along the:

Why-facet: adopt, use, and/or improve (could be the entire blogosphere or blogs that have provided links to the Apple corporate site in a given period of time).

How-facet: personal diary and topic blog.

Internet user Joe reaches blog A that has been classified as <<use>> why-facet, <<topic blog>> how facet. Joe then clicks on a link that redirects him/her to the Apple corporate site.

Internet user Jack reaches Blog B that has been classified as <<adopt>> why-facet and <<personal diary>> how-facet and then clicks on a link (it could be the same link) that redirects him to the Apple corporate site.

Both users are also known as coming from the for example the San Jose Area by looking at their IP addresses.

Then, for example, Apple can present the following:

To Joe Apple could present a landing page about Apple add-on software for the Mac and the Ipod, accessories, and/or links to Apple users group from the San Jose area, and To Jack Apple could present an entertaining video of someone using an iPod, along with an incentive to buy an iPod and/or info on local shops selling Apple products.

A person of average skill in the art would also appreciate the implementation of the present method, which could be established as a computer-implemented method with one or more routines, whereby the routines could be standalone running on a computer system or distributed over a network of computer systems. All such variations are considered to be within the scope and spirit of the present invention as defined by the following claims and their legal equivalents.

What is claimed is:

1. A method for selecting and placing an advertisement, comprising the steps of:

(a) defining, by a computer, and storing on a computer storage medium an Ad campaign project model;

(b) defining, by a computer, for said Ad campaign advertising messages and targets for placement in blogs according to a plurality of facets;

(c) said computer defining one of said facets as a why-facet for each of said advertising message and targets, wherein said why-facet defines the objective of the advertising message and the advertising target;

(d) said computer defining one of said facets as a how-facet for each of said advertising message and targets, wherein said how-facet defines the style of said advertising message and said advertising target;

(e) said computer defining one of said facets as a what-facet for each of said advertising message and targets, wherein said what-facet defines the type of product or service of said advertising message and said advertising target;

(f) said computer defining one of said facets as a who-facet for each of said advertising message and targets, wherein said who-facet defines the type of audience or community for said advertising message and said advertising target; defining keyword features and non-keyword features for each of said why-facet, said how-facet, what-facet and who-facet;

(h) said computer receiving a blog content from a blogosphere;

(i) said computer analyzing said received blog by extracting keywords and non-keywords from said blog, wherein said extracting non-keywords from said blog is based on said computer performing a combination of:" (i) a structural analysis of said blog, (ii) a stylistic analysis of said blog, and (iii) a linguistic analysis of said blog;

(j) said computer classifying from said Ad campagin project model which type of facet of said plurality of said defined facets corresponds to said extracted combined keywords and non-keywords;

(k) said computer determining which advertisement message and advertising target to be placed in said blog based on said classified facet; and (l) said computer communicating with said blog the placement of said determined advertisement message and advertising target in said blog, wherein said method does not rely on a demographic description, a survey or a self-declared profile.

2. The method as set forth in claim 1, wherein said why-facet comprises why-facet labels.

3. The method as set forth in claim 2, wherein said why-facet labels are adopt, use or improve.

4. The method as set forth in claim 1, wherein said how-facet comprises how-facet labels.

5. The method as set forth in claim 4, wherein said how-facet labels differentiate the style, originality, nature or complexity of an advertisement or a message.

6. The method as set forth in claim 1, wherein said objective as defined by said why-facet labels are labelled by said computer as: (i) having a sell or promote objective or (ii) a teaching objective.

7. The method as set forth in claim 1, wherein said type of audience or community as defined by said who-facet labels are labelled by said computer as: (i) an expert audience or community or (ii) a novice audience or community.

* * * * *